United States Patent [19]
Chepelev et al.

[11] 3,714,455
[45] Jan. 30, 1973

[54] INSULATION TESTER

[75] Inventors: Viktor Gavrilovich Chepelev; Nikolai Nikolaevich Grinchenko; Jury Moiseevich Goldshein, all of Kharkov, U.S.S.R.

[73] Assignee: Spetsialnoe Proektno-Konstruktorskoe I Tekhnilogicheskoe Bjuro PO Elektroburenriju (Sktbe), Kharkov, U.S.S.R.

[22] Filed: July 21, 1971

[21] Appl. No.: 164,580

[52] U.S. Cl. .......................................307/112, 324/54
[51] Int. Cl. ..............................................H02b 1/24
[58] Field of Search ....324/10, 54; 307/112, 149, 92, 307/93, 113, 114, 115, 138, 139

[56] References Cited

UNITED STATES PATENTS

| 3,526,831 | 9/1970 | Smith | 324/54 |
| 3,569,826 | 3/1971 | Burnett | 324/54 |

Primary Examiner—Herman J. Hohauser
Attorney—Eric H. Waters et al.

[57] ABSTRACT

An insulation tester comprising a down-the-hole switching element and an out-of-the-hole switching element using a parallel-opposing combination of a rectifier and a thyristor, a control unit, a current transformer, and a measuring unit comprising a voltage-amplitude meter, a rectifier, a differential relay, and a ratiometer.

1 Claim, 1 Drawing Figure

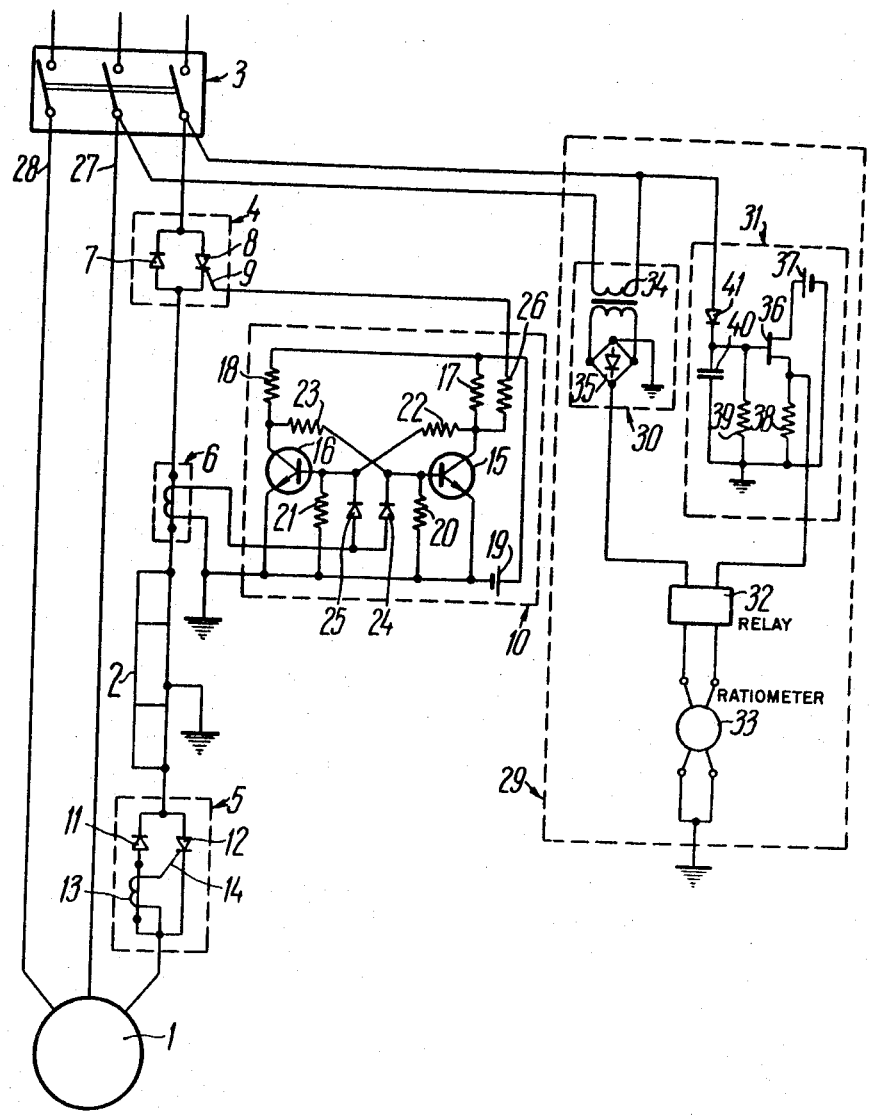

INSULATION TESTER

The present invention relates to insulation testers for the power cable and stator winding of a running submersible motor operating by means of a circuit consisting of two wires and a string of pipes and, more specifically, to electric drills.

Known in the art are methods and means to test the insulation resistance of a system comprising an electric plant and a cable line.

In each particular case the choice of a method is determined by the objective of the test, the quality of the insulation as expressed in terms of a particular characteristics required, and the conditions under which the given system operates.

In systems not containing elements electrically connected to ground, the insulation resistance may be tested with any of a great variety of known methods.

A distinction of the methods and means to test the insulation resistance of systems containing a grounded phase is the need to disconnect the system from the grounded phase so that the insulation can be measured relative to ground.

Among existing means serving this purpose, mention may be made of, for example, electromagnetic devices whose operating mechanism is placed in the ungrounded phases of the system and the contacts in the grounded phase. When the power system is connected to the supply, the electromagnetic device operates and its contacts connect the system to ground, thereby insuring normal operation of the system. When the system is disconnected from the power supply, the electromagnetic device is de-energized and disconnects the system from ground, thereby making it possible to test the insulation resistance with usual megohmmeters.

The operating mechanism of the device connecting and disconnecting the system to and from ground may be independent of the power supply, for example, hydraulic, pneumatic, etc.

Also known in the art is a device which has the greatest number of features common with the present invention and which is likewise a solid-state circuit using two semiconductor devices one of which is controlled. When connected in parallel opposition in the grounded phase of the system, these devices allow normal current flow in the grounded phase of the system when it is connected to the power supply, and provide for measuring the insulation resistance to ground with a d.c. instrument when the system is disconnected from the power supply.

It should be noted that in testing the insulation resistance with any one of the above-mentioned devices connecting the measured system to ground, it is essential to disconnect the system from the power supply, which entails a stoppage of the associated process and is a major disadvantage of the above-mentioned devices.

Among the devices which do not call for the shutdown of the associated process for testing the insulation resistance, there is a fast-operating device which, like those already mentioned, disconnects the electric plant-cable line system from the power supply having a grounded neutral, the difference being that the system is disconnected for only a short time interval during which the electric plant (say, an electric motor) can affect the operating conditions (for example, the speed of the shaft) but slightly. This time interval may be utilized for automatically testing the insulation resistance of the system to ground with a measuring device synchronized with the disconnecting device. Among the disadvantages of the latter is that it cannot be used in systems containing an electric plant with a considerable and rapidly varying load (for example, the electric motor of an electric drill), where the disconnection of the electric plant from the power supply even for the shortest time interval is ruled out because of the danger of upsetting the entire process or damage to the system.

It is an object of this invention to provide an insulation tester for a system one phase of which is grounded, without disconnecting the system from the power supply and without stopping the associated process.

Another object of the present invention is to effect a preventive disconnection of the measured system, for example, an electric drill and its power cable, from the power supply, should the insulation resistance drop below a safe limit.

Still another object of the present invention is to measure the insulation resistance of the sheath of an armored cable, a pipe containing conductors, an so forth.

With these and other objects in view, the invention resides in that in an insulation tester for the power cable and the stator winding of a running submersible motor, with the string of pipes used as one of the phases of the power supply circuit, electrically connected to the winding of a submersible motor via a down-hole switching means using a parallel-opposing combination of a semiconductor rectifier and a thyristor complete with a control system, disconnecting the motor winding from the pipe for the time interval during which a resistance-measuring element is brought in circuit, use is made of an additional out-of-the-hole commutator, likewise using a parallel-opposing combination of a semiconductor rectifier and a thyristor placed between one phase of the mains and the top end of the grounded conductor (the pipe string), controlled by a semiconductor switch in the form of a trigger circuit and connected with its input to the grounded and the ungrounded output terminals of a current sensing device in the form of a current transformer whose primary is connected in series with the grounded conductor and the motor winding, while one of the arms of the trigger circuit is connected to the gate of the thyristor in the additional commutator and two terminals of said measuring element are connected to the two common junctions, of the rectifier and thyristor in the same additional commutator and the third to the outer end of the ungrounded phase.

The invention will be more fully understood from the following detailed description of the invention when read in connection with the accompanying drawing, which shows a preferred form of the device circuit, according to the invention.

Referring to the drawing, there is an electric motor 1 the supply circuit of which uses a string of pipes 2 as a grounded conductor connected to a disconnector 3 via a switching element 4 and to the electric motor 1 via a switching element 5. Placed between the switching element 4 and the pipe string 2 is the primary winding of a current transformer 6. The semiconductor rectifier 7 of the switching element 4 is connected in parallel opposition with the thyristor 8 whose gate 9 is connected to the output of a control unit 10.

The cathode of the rectifier 7 and the anode of the thyristor 8 are connected to the disconnector 3, while the anode of the rectifier 7 and the cathode of the thyristor 8 are grounded via the primary winding of the current transformer.

The rectifier 11 and the thyristor 12 of the switching element 5 are connected in parallel opposition. The primary of a current transformer 13 is connected in series with the rectifier 11 and the secondary is placed between the cathode and gate 14 of the thyristor 12. The anode of the rectifier 11 and the cathode of the thyristor 12 are connected to the grounded phase of the electric motor 1, while the anode of the rectifier 11 and the anode of the thyristor 12 are grounded. The control unit 10 is a trigger circuit based on two transistors 15 and 16 whose emitters are grounded and whose collectors are connected via resistors 17 and 18 to a voltage source 19 the negative side of which is grounded.

The bases of the transistors 15 and 16 are grounded via resistors 20 and 21. The collector of the transistor 15 is connected via a resistor 22 to the base of the transistor 16, and the collector of the transistor 16 is connected via a resistor 23 to the base of the transistor 15. The bases of the transistors 15 and 16 are also connected respectively to the cathodes of rectifiers 24 and 25 whose anodes are connected to one of the leads of the secondary of the current transformer 6 while the other lead of its secondary is grounded. The collector of the transistor 15 is connected via a resistor 26 to the gate 9 of the thyristor 8. The measuring unit 29 is connected to one of the grounded phases and to the common junction of the thyristor anode and the rectifier cathode and also, via ground, to the common junction of the rectifier anode and the thyristor cathode.

The measuring unit 29 contains an unstabilized rectifier 30, a voltage-amplitude meter 31, a differential relay 32, and a ratiometer 33 with its scale calibrated in units of resistance.

The rectifier 30 is built around a voltage transformer 34 whose primary is connected to the disconnector 3 between the grounded phase 2 and one of the ungrounded phases, say, the phase 27, while its secondary is connected to the input of a bridge rectifier circuit 35.

One junction of the bridge rectifier circuit 35 is grounded, and another junction is connected to the series combination of one of the windings of a relay 32 and one of the coils of the ratiometer 33 the two coils of which have a common grounded junction. The other coil of the ratiometer 33 is placed in series with the other winding of the relay 32 and connected to the emitter of a UFET (unipolar field-effect transistor) 36 set up in an emitter-follower circuit.

Besides, the transistorized voltage-amplitude meter 31 contains a d.c. source 37 placed between the UFET 36 and ground; a resistor 38 placed between the source of the UFET 36 and ground; a resistor 39 and a capacitor 40 whose parallel combination returns the base of the UFET 36 to ground; and also a rectifier 41 connected to the base of the UFET 36 with its cathode and to the phase 2 of the disconnector 3 with its anode.

The insulation tester of FIG. 1 operates as follows. When the disconnector 3 is closed to connect the electric motor 1 to an a.c. source (not shown), the motor 1 is energized over the ungrounded phases 27 and 28 and the grounded phase 2, so that the rectifiers 7 and 11 allow the passage of negative half-cycles and the thyristors 8 and 12 allow the passage of positive half-cycles through the phase 2, provided there is a control potential applied to the gate 9 from the unit 10.

The secondary voltage of the transformer 6 at the power supply frequency is applied to the input of the control unit 10 whose output furnishes an alternating voltage at a frequency half the input frequency, which is applied to the gate 9 of the thyristor 8.

Since the thyristor 12 is already made conducting by the beginning of a positive half-cycle of the supply voltage owing to the application to its gate 14 of a control voltage from the secondary of the transformer 13 as a negative half-cycle passes through the rectifier 11, and is maintained in the conducting state by the positive half-cycle, the winding of the motor 1 is connected to the grounded phase 2 when the thyristor 8 is turned on by application to its gate 9 of a maximum voltage from the output of the unit 10, so that the winding of the motor 1 is connected every other cycle of the supply frequency.

When there is no voltage applied to the gate 9 from the unit 10, that is, every other cycle of the supply frequency, the thyristor 8 is turned off, the positive half-cycle cannot pass through the phase 2, and the thyristor 12, not maintained in the conducting state by this half-cycle, is also turned off.

Thus the entire system is disconnected from the grounded phase 2 every other cycle of the power supply frequency for a time interval not exceeding a half-cycle of the power supply frequency, thereby providing the possibility of testing the insulation resistance of the entire system to ground.

The rate at which the system is disconnected from ground should be such that the disconnection will have the least effect on operation of the electric motor 1, on the one hand, and the insulation resistance can be measured at the required intervals, on the other.

The rate of disconnection of the measured system from ground can be controlled with any of the many existing combinations of trigger circuits in the unit 10.

The insulation resistance of the system to ground can be tested with the measuring unit 29, as follows.

The magnitude of the voltage across the turned-off thyristor 8 during a positive half-cycle is a function of the insulation resistance. This is because when the thyristor is OFF the series combination of the equivalent resistance of the switching element 4 and the equivalent insulation resistance of the measured system, shunted by the equivalent resistance of the switching element 5, is connected to the line voltage of the supply source. As a consequence, the voltage measured across the turned-off switching element 4 is decided by the relative magnitudes of these quantities and will be the higher, the worse is the insulation, and may reach the amplitude value of the applied line voltage, should the insulation resistance drop to zero.

When the thyristor 8 is OFF, a positive half-cycle of the voltage across the element 4 charges the capacitor 40 via the rectifier 41 which prevents the capacitor 40 from discharging through the thyristor 8 when the latter is driven to conduction.

As a consequence, the capacitor 40 may discharge mainly through the resistor 39, and the voltage across this capacitor, when applied to the input of the emitter follower, will determine the output voltage of the latter and, therefore, the current in the winding of the relay 32 and the coil of the ratiometer 33.

The fact that the winding of the relay 32 and the coil of the ratiometer 33, placed in the circuit of the rectifier 30, are connected differentially with respect to the second winding and coil of the same elements eliminates the effect of variations in the supply voltage on the insulation test.

The contacts (not shown) of the relay 32, placed in the circuit of the operating mechanism of the disconnector 3, will disconnect the measured system from the supply source should the insulation resistance drop below a safe limit.

The embodiment of the invention described above should be regarded only as an illustration; it does not limit the field of application of the present invention, and permits any modifications and changes within the scope of the accompanying claims.

What is claimed is:

1. An insulation tester for a power cable and stator winding of a running submersible motor operated from a multi-phase power supply and attached to a grounded string of pipes, comprising:

a down-the-hole switching means including a parallel opposing combination of a semiconductor rectifier and a thyristor and a control circuit, electrically connected between the winding of the submersible motor and the grounded string of pipes which is used as a power conductor;

said down-the-hole switching means for disconnecting the winding of the submersible motor from the string of pipes during an insulation test;

an out-of-the-hole switching means including a parallel-opposing combination of a semiconductor rectifier and a thyristor and a gate associated with the latter said resistor, electrically placed between one phase of the power supply and the top end of the grounded string of pipes;

said out-of-the-hole switching means for disconnecting the power supply from the string of pipes during an insulation test;

a thyristor-control circuit including an input and an output including an ungrounded terminal, said circuit being adapted for controlling the thyristor in the out-of-the-hole switching means and further including a semiconductor switch connected with the ungrounded terminal of the output of the circuit to the gate of the latter said thyristor;

said thyristor-control circuit being adapted for turning off the latter said thyristor during an insulation test; and a circuit to control the semiconductor switch, including a current sensing element in the form of a current transformer including a core with a rectangular B-H loop, said transformer including a primary in series with the grounded conductor and the motor winding and further including a secondary including grounded and ungrounded terminals connected to the input of said semiconductor switch;

said circuit for control of the semiconductor switch, furnishing peaked pulses each time the current in the grounded pipe string passes through zero.

* * * * *